United States Statutory Invention Registration [19]

[11] Reg. Number: H903

Weinstein [43] Published: Apr. 2, 1991

[54] COOL TIP COMBUSTOR

[75] Inventor: Barry Weinstein, Georgetown, Mass.

[73] Assignee: General Electric Company, Lynn, Mass.

[21] Appl. No.: 374,355

[22] Filed: May 3, 1982

[51] Int. Cl.[5] ..... F02C 1/00
[52] U.S. Cl. ..... 60/757
[58] Field of Search ..... 60/755, 757, 39.32, 60/39.83

[56] References Cited

U.S. PATENT DOCUMENTS

| | | | |
|---|---|---|---|
| 2,712,729 | 7/1955 | Wigg . | |
| 3,485,043 | 12/1969 | Ehrich . | |
| 3,849,022 | 11/1974 | Amann et al. | 415/178 |
| 3,965,066 | 6/1976 | Sterman et al. | 60/39.32 |
| 3,995,422 | 12/1976 | Stamm . | |
| 4,050,241 | 9/1977 | DuBell . | |
| 4,064,300 | 12/1977 | Bhangu . | |
| 4,077,205 | 3/1978 | Pane et al. | 60/39.32 |
| 4,104,874 | 8/1978 | Carvel et al. . | |

FOREIGN PATENT DOCUMENTS

| | | |
|---|---|---|
| 982828 | 2/1976 | Canada . |
| 0049190 | 4/1982 | European Pat. Off. . |
| 49-54711 | 5/1974 | Japan . |
| 52-13015 | 2/1977 | Japan . |
| 776847 | 6/1957 | United Kingdom . |
| 1193587 | 6/1970 | United Kingdom . |
| 1524956 | 9/1978 | United Kingdom . |
| 2016091 | 9/1979 | United Kingdom . |

*Primary Examiner*—Michael Carone
*Attorney, Agent, or Firm*—Nathan D. Herkamp

[57] ABSTRACT

A gas turbine engine is provided with a means for cooling tips of turbine blades in a hot turbine section of the engine. Inlet air holes are provided in a radially outer wall section of the combustor, just upstream of a turbine nozzle. Cooling air flows through these inlet air holes, into annulus regions protected from combustion gases, and then downstream along a radially outer wall of the turbine. The cooling air forms a film that cools the turbine blade tips in a localized manner that adds to total engine power output.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COOL TIP COMBUSTOR

The Government has rights in this invention pursuant to Contact No. N00019-77-C-0201 awarded by the Navy.

BACKGROUND OF THE INVENTION

1. Field of the Invention

This invention relates to means for directing cooling air to critical parts of hot section turbine blades in gas turbine engines.

2. Description of the Prior Art

In the course of gas turbine engine development, tremendous effort has been directed at raising the internal operating temperatures of such engines to improve thermodynamic efficiency. As turbine inlet temperatures have been increased in pursuit of this goal, it has become necessary to provide cooling air to hot section turbine blades and vanes in order to limit temperatures of those components to levels that can be accommodated by the blade and vane materials. The air that is used for this cooling function is usually compressed to pressures that meet or exceed the gas pressures inside the turbine section. Because the air has undergone the work necessary for compression, this cooling air must be used as efficiently as possible to limit the power required by the engine's compressor section in order to compress that air. To limit the amount of cooling air used, intricate cooling air flowpaths and passages are utilized that are intended to use the cooling air in a highly efficient manner.

In smaller airflow size engines, blade cooling configurations are generally restricted to fairly simple designs because of small dimensions and limitations of current manufacturing technologies. The implication is a typical smaller engine turbine blade or vane cannot be provided with the highly complex, internal air cooling passage configuration typically used today in larger gas turbine engines.

One particular problem with smaller engines is that tip sections of turbine blades are extremely difficult to cool efficiently. The cooling air used to internally cool turbine blade tips has increased its temperature by thermal pickup in the lower portion of the blade rendering it less effective for cooling purposes. In downstream sections of the turbine blade tips some of the cooling air has been bled out of the trailing edge cooling holes before it reaches the blade tip region, thereby reducing cooling air velocity and, consequently, its cooling effectiveness. Adding to these difficulties of cooling small turbine blades, the downstream trailing edge of the blade tip region is usually very thin for aerodynamic performance reasons, which limits the ability to duct cooling air into this region.

As a result of these inherent limitations, design cycle temperatures of these small engines are restricted and engine performance is thereby limited. Further, the turbine blade tips often become a life-limiting engine component problem area. As the turbine tips deteriorate, due to oxidation and corrosion accumulating during engine use, the engine performance drops below minimum acceptable levels. The engine must then be removed from the aircraft and the turbine section refurbished. Maintenance and overhaul of the turbine section to correct deteriorated blade tips is both expensive and time consuming.

It is, therefore, an object of the present invention to provide a means for cooling tips of turbine blades in turbine sections of gas turbine engines with a system that can be utilized in relatively small engine configurations.

Another object of the present invention is to provide a source of cooling air that can be directed specifically to turbine blade tips in a turbine section of a small gas turbine engine.

It is another object of the present invention to provide a film of coating air along a radially outer most wall of a turbine section of a small gas turbine engine for the purpose of cooling turbine blade tips with a limited amount of cooling air.

These and other objects will become more readily apparent upon reference to the following description in conjunction with the appended drawings.

SUMMARY OF THE INVENTION

Briefly, in accordance with one embodiment of the present invention, means are provided for introducing cooling air into a turbine section of a gas turbine engine in the region of tip sections of turbine blades. The source of this cooling air is compressor discharge air that has bypassed the combustor. This compressor discharge air is introduced at an aft section of the combustor through inlet air holes just upstream of the turbine section. The air is introduced along a radially outer section of the combustor only. The cooling air flows initially into annulus regions within the combustor that are protected from hot combustion gases. From these annulus regions, the air flows downstream in the combustor and forms a thick film that blankets the combustor wall. Because it is introduced at the downstream section of the combustor, there is no combustion of this cooling air, and it enters the turbine section at close to the same temperature as when the cooling air entered the combustor section. This temperature is much lower than the hot gases which have just undergone combustion. This thick, low-temperature cooling air film flows into the turbine section along a radially outer wall of the turbine flow path. The cooling air film provides a relatively cooler gas flow along the tips of the turbine blades rotating in the turbine section. It is primarily the tips of the turbine blades only that are thus cooled, and this limits the amount of cooling air employed.

A BRIEF DESCRIPTION OF THE DRAWINGS

DESCRIPTION OF THE PREFERRED EMBODIMENT

Figure 1:
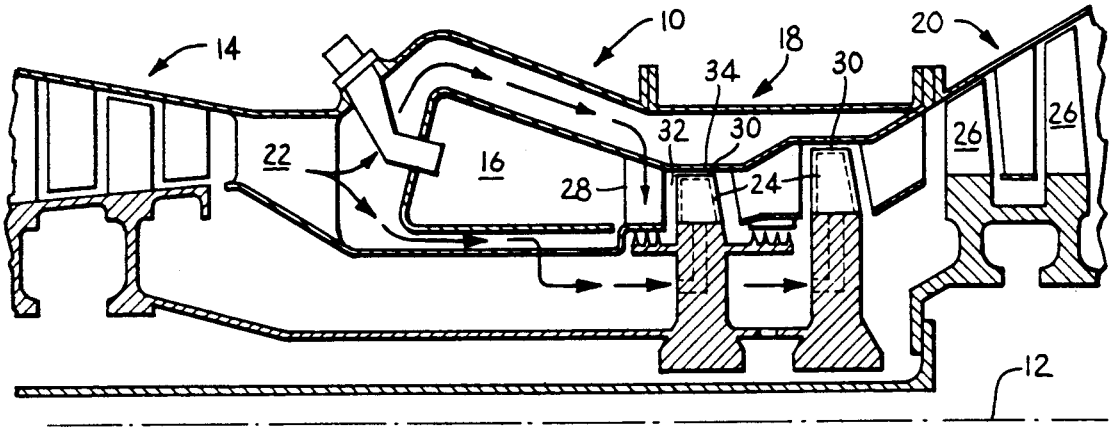
Fig 1 PRIOR ART
FIG. 1 is a schematic cross-sectional illustration of a central section of a gas turbine engine.

Referring now to FIG. 1, a central section of a typical gas turbine engine 10 is shown that involves substantial turbomachinery that rotates about an engine centerline 12. Components of this turbomachinery include, in serial flow relationship, a compressor 14, a combustor 16, a high-pressure turbine section 18, and a low-pressure turbine section 20. In conventional operation, inlet air is directed into and pressurized by the compressor 14 from which the air is discharge through a diffuser 22. A major portion of this compressor discharge air is then passed into the combustor 16 where it is mixed with fuel and vaporized to form high-pressure, high-temperature combustion gases which flow downstream into the high-pressure turbine 18. The high-pressure gases cause turbine blades 24 in the high-pressure turbine 18 to rotate at high velocities thereby providing mechanical power. These high-temperature, high-pressure gases then continue to flow downstream into the low-pressure turbine 20 where they cause low-pressure turbine blades 26 to rotate thereby providing additional mechanical power. From the low-pressure turbine 20, the gases are discharged downstream so as to pass out of the engine 10.

A portion of the air discharge from the compressor 14 that passes through the diffuser 22 is circulated to cool a variety of hot pairs of the engine 10. Some of that air used for cooling flows to the region of the combustor 16 and surrounds the combustor walls. In some engines, small cooling holes are provided in the combustor walls so that cooling air can enter the combustor to cool interior combustor surfaces. Other portions of the cooling air are directed internally to hot temperature parts inside the high-pressure turbine 18. A part of this air used to cool the high-pressure turbine is directed into the interior of a high-pressure turbine nozzle 28 so as to provide an internal cooling function by impingement and diffusion processes. Another part of the compressor discharge air is directed along other paths to cool interior regions of the turbine blades 24 of the high-pressure turbine 18. These cooling flowpaths are generally represented by the dark arrows in FIG. 1.

It is well-known in the art that during high-power, high-temperature operating conditions a substantial amount of cooling air is needed for these cooling processes. Because of the limitations of size and manufacturing processes, it is particularly difficult to cool tip sections 30 of the turbine blades 24. These tip sections 30 are usually very thin for, aerodynamic performance reasons and this limits the ability to efficiently duct cooling air into the tip sections. In addition, the thin sections deteriorate due to oxidation and corrosion causing substantial problems in engine performance.

A prior art solution to the problem of cooling turbine blade tips is a ducting of a small portion of the compressor discharge cooling air into the high-pressure turbine 18 at an inlet location 32 just downstream of the turbine nozzle 28. Cooling air ducted in this manner would bypass the combustor and flow into the high-pressure turbine 18 just upstream of the turbine blade 24. Studies have indicated that this proposal reduces turbine tip temperatures, but this approach also has a negative impact on engine performance, both in terms of thrust and fuel consumption. The detrimental effect on engine performance is caused because the cooling air enters the gas flow stream behind the first-stage turbine nozzle 28 and is, therefore, chargeable to the engine's thermodynamic cycle. As a result, the amount of air burned compared to the allowable turbine rotor inlet temperature level is reduced and engine performance decreases.

Figure 2:
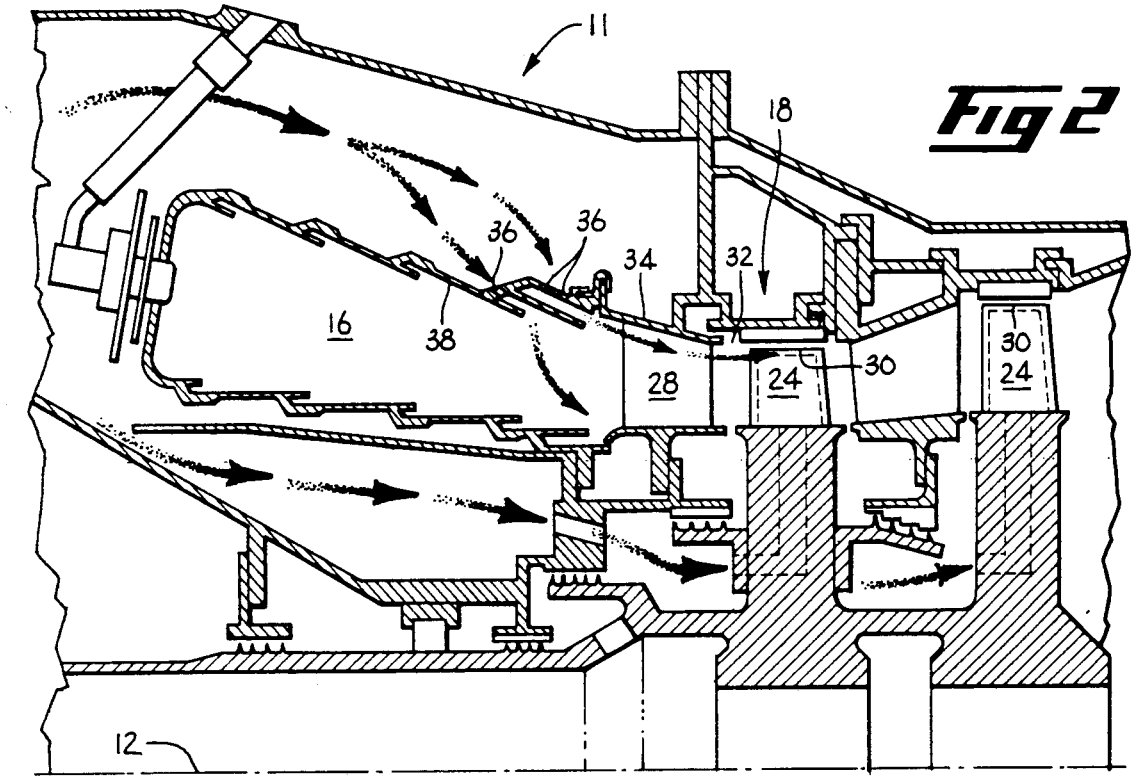
FIG. 2 is a schematic cross-sectional illustration of a combustor and high pressure turbine section of a gas turbine engine with the present invention embodied therein.

Referring now to FIG. 2, a portion of a gas turbine engine 11 is shown that is generally similar to part of the engine shown in FIG. 1 but, this time, incorporating an embodiment of the present invention. Again, as explained in relation to the engine shown in FIG. 1, a portion of the cooling air discharged from the compressor does not enter the combustor 16, but, instead, flows downstream around the combustor as indicated by dark arrows in FIG. 2. This cooling air does not undergo the mixing and combustion processes occurring during engine operation inside the combustor 16. Because the air does not undergo combustion, it remains relatively cool and serves as a source of high-pressure cooling air that can be utilized in the high-pressure turbine sections of the engine. Any cooling air used in the high-pressure turbine section must be at high pressure because the internal gases flowing through the high-pressure turbine area, as the name suggests, are at very high pressure. The cooling air introduced into the high-pressure turbine must be even higher in pressure than those gases flowing through the turbine so that the cooling air will be caused by its own pressure forces to flow into the turbine blades and vanes and from there into the combustion gas flow passage of the turbine section. If the cooling air that was used for cooling in this region were lower in pressure than the combustion gases flowing through the turbine section, pressure forces would not permit the cooling air to flow from interior regions of the turbine blades and vanes out into the combustion gas flow passage.

Realizing that this compressor discharge air is the best available source of cooling air flow that can be utilized for cooling turbine blades, the problem becomes a matter of utilizing this air in the best manner possible to cool the turbine blades and the turbine blade tips. It is extremely important that the volume of cooling air used be kept as low as possible because the air has undergone a great deal of work in the compressor section in order to compress that air, and it is desirable to minimize the amount of air used in order to increase the efficiency of the engine. It is also desirable to introduce this highly compressed cooling air in a location that permits highly pressurized air to be expanded and directed at the turbine blades in a manner such that the cooling air will not only cool the tips of the turbine blades but will also add to the effective gas forces that cause the turbine blades 24 to rotate, thereby increasing the total power produced by the engine 10.

If cooling air is introduced at an inlet location 32 immediately downstream of the turbine nozzle 28, the air will tend to cool the turbine blade tips 20. However, because the air has not been expanded and directed by the turbine nozzle 28, it will not be useful for providing appropriate gas forces for causing the turbine blades 24 to rotate.

The present invention comprises means for introducing cooling air forward or upstream of the first-stage turbine nozzle 28 so that there is no associated engine performance penalty. One embodiment of this means is shown in FIG. 2, and a part of the invention is shown in larger scale in FIG. 3. Referring initially to FIG. 2, a portion of the compressor discharge air that is flowing outside of the combustor 16 is directed into combustor inlet air holes 36 at a location just upstream of the turbine nozzle 28. The air is introduced at a location just upstream of the turbine nozzle 28, partly to prevent that cooling air from undergoing the normal combustion processes inside the turbine 16, and also to lessen heating of the cooling air from prolonged exposure to the hot combustion gases. If this cooling air were to undergo combustion, it would climb dramatically in temperature and be rendered relatively useless for the purpose of cooling tips 30 of turbine blades.

Figure 3:
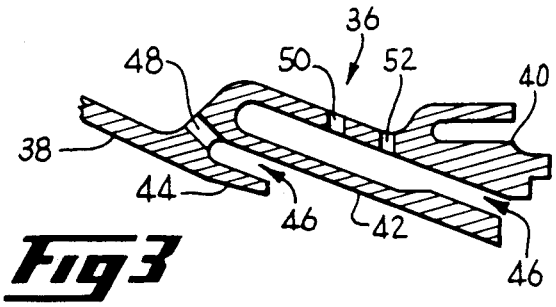
FIG. 3 is a cross-sectional illustration of a downstream portion of a combustor wall with one embodiment of part of the present invention incorporated therein.

Referring now to FIG. 3, the inlet air holes 36 through which the cooling air is directed into a downstream section of the combustor 16 are shown in greater detail. A portion of a radially outer wall section 38 of the combustor 16 is shown in FIG. 3. This portion of the combustor wall section 38 is located just upstream of the turbine nozzle 28 (not shown). In the cross-sectional view shown, three inlet air holes 36 can be seen and their relative configuration can be appreciated. It should first be noted that the downstream portion of the combustor wall section 38 is actually double-walled. An outer wall section 40 connects to the turbine nozzle in a standard manner as would be the normal practice in many gas turbine engines. An inner combustor wall section 42 is provided and is protected from hot combustion gases at its upstream end by a flange 44. At its downstream end, the inner wall section 42 extends almost to the turbine nozzle inlet. Cooling air from the compressor discharge is bled into annulus regions 46 that are open in a downstream direction and are generally protected from the combustion occurring inside the combustor 16. Because the cooling air is bled into these protected annulus regions 46, the cooling air does not undergo combustion, and the air enters the turbine nozzle at substantially compressor discharge temperature, thereby forming a thick, low-temperature film along a radially outer wall of the turbine flow path.

As stated earlier, there are three inlet air holes 36 visible in FIG. 3. Each of the holes 36, as shown, represents one of a row of holes that extend around the entire circumference of the radially outer wall section 38 of the combustor 16. The total number of inlet air holes 36 could vary widely as could their general configuration.

A row of upstream inlet air holes 48 is provided to bleed cooling air into the annulus region between the flange 44 and the inner wall 42. A row of intermediate inlet air holes 50 is provided to bleed additional cooling air into the annulus region between the inner wall 42 and the outer wall 40. Finally, a row of downstream inlet air holes 52 is provided to direct additional cooling air into the annulus between the inner wall 42 and the outer wall 40. It can be readily appreciated by those skilled in the art that the size of these inlet air holes 36 can be varied for the purpose of introducing varying amounts of cooling air. To serve as a guide, in one embodiment of the present invention, these holes are varied from 0.26 inches (0.066 cm.) in diameter to 0.035 inches (0.089 cm.) in diameter. These dimensions, however, are simply a guideline and smaller or larger diameter holes could easily be utilized without departing from the scope of the present invention. Additionally, widely varying inlet air hole configuration would also be within the scope of the invention.

Referring again to FIG. 2, small black arrows are shown entering the combustor 16 emanating from the annulus regions 46 within the combustor 16 and flowing downstream along the radially outer turbine wall 34, past the turbine nozzle 28 to the region of the turbine blade tips 30. This air tends to flow as a low temperature film in a manner that is ideal for cooling the turbine blade tips 30 without using excessive amounts of compressor discharge air thereby accomplishing the purpose of the present invention.

Figure 4:
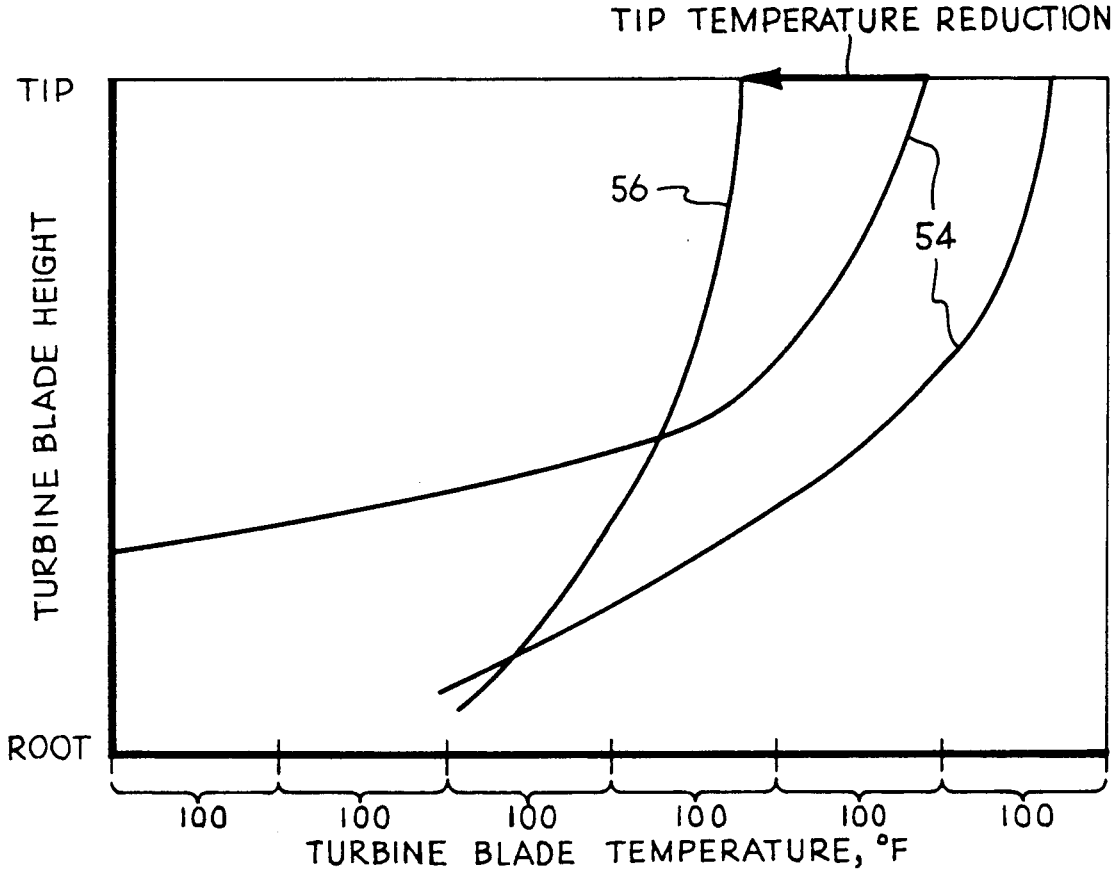
FIG. 4 is a graphical representation of test results of turbine blade temperatures.

Referring now to FIG. 4, a comparison of test results is shown that graphically represents turbine blade temperatures in a typical gas turbine engine and, additionally, represents turbine blade temperatures in a second gas turbine engine incorporating the present invention. The X (horizontal) coordinate in FIG. 4 is marked off in degrees Fahrenheit. The Y (vertical) coordinate in FIG. 4 is a dimensionless representation of turbine blade height, beginning at a root of the turbine blade and ending at the tip of the turbine blade. The lines shown on the graph of FIG. 4 designated 54 represent turbine blade temperatures in two typical gas turbine engines, generally having an engine configuration similar to that shown in FIG. 2 but without incorporating the present invention. The line designated 56 in FIG. 4 represents turbine blade temperature, again within an engine having generally the same configuration as shown in FIG. 2, but this time incorporating the present invention. It can be readily appreciated that turbine tip temperatures are significantly decreased in the engine incorporating the present invention. Because of this temperature reduction at the turbine tip, the present invention has been commonly referred to as a "cool tip" engine. It is important to note that this reduction in turbine tip temperatures is achieved generally without utilizing excessive amounts of compressor discharge air and in a manner that directs the cooling effect at the turbine blade tips. It is desirable to obtain this "cool tip" effect in a localized manner as shown graphically in FIG. 4.

Although the present invention has been described in terms of its preferred embodiment, it will be apparent to those skilled in the art that changes and modifications thereof may be made without departing from the scope of the appended claims which define the present invention.

Having described the invention, what is claimed as novel and desired to be secured by Letters Patent of the United States is:

1. In a gas turbine engine having a compressor, a combustor, a turbine section with a turbine nozzle and turbine blades, all in serial flow relationship and disposed radially about an engine centerline, means for cooling tips of said turbine blades comprising:

an inner wall section extending radially inwardly and in a downstream direction from a radially outer wall section of a downstream end portion of said combustor, said inner and outer wall sections defining a first annulus therebetween, said outer wall section including a plurality of first inlet air holes in flow communication with said first annulus, said first holes being sized for channeling a predetermined amount of high-pressure cooling air from said compressor, for forming a cooling air film that extends downstream from said first annulus and along a radially outer wall of said turbine section to cool said turbine blade tips.

2. The gas turbine engine recited in claim 1 wherein said first annulus and said inner wall section extend substantially to an inlet of said turbine nozzle for thereby preventing combustion of said cooling air in said combustor.

3. The gas turbine engine recited in claim 1 wherein said first inlet air holes include an intermediate row of inlet air holes extending circumferentially around said combustor and, additionally, a downstream row of inlet air holes extending circumferentially around said combustor.

4. In a gas turbine engine having a compressor, a combustor, a turbine section with a turbine nozzle and turbine blades, all in serial flow relationship and disposed about an engine centerline, means for providing a film of cooling air along a radially outer wall of said turbine section for cooling tips of said turbine blades, said means comprising:

an upstream row of inlet air holes extending circumferentially around a radially outer wall section of said combustor, wherein compressor discharge air is directed into an annulus between a flange and an inner wall of said combustor, an intermediate row of inlet air holes and a downstream row of inlet air holes, both rows extending circumferentially around said radially outer wall section of said combustor, wherein compressor discharge air is directed from said intermediate row and said downstream row into another annulus between said inner wall and said outer wall section of said combustor;

said annuli being open in a downstream direction, and said intermediate and downstream rows of inlet air holes being sized for collectively channeling a predetermined amount of said compressor discharge air for forming a film of cooling air that extends downstream along a radially outer wall of said turbine section thereby cooling tips of said turbine blades.

5. The gas turbine engine recited in claim 1 further including a flange extending from said outer wall section in a downstream direction, said flange being spaced radially inwardly from said inner wall section for defining a second annulus therebetween, said outer wall section including a plurality of second inlet air holes in flow communication with said second annulus, said second holes being sized for channeling a predetermined amount of said cooling air for protecting said inner wall section from combustion gases.

* * * * *